(12) United States Patent
Bastard et al.

(10) Patent No.: US 7,654,773 B2
(45) Date of Patent: Feb. 2, 2010

(54) SYSTEM AND METHOD FOR INSTALLING A SUBSEA PIPELINE

(75) Inventors: Antoine Bastard, Houston, TX (US); Kevin Legris, Houston, TX (US); Julie LePocreau, Houston, TX (US)

(73) Assignee: Technip France, Courbevoie (FR)

( * ) Notice: Subject to any disclaimer, the term of this patent is extended or adjusted under 35 U.S.C. 154(b) by 179 days.

(21) Appl. No.: 11/961,724

(22) Filed: Dec. 20, 2007

(65) Prior Publication Data

US 2009/0162146 A1    Jun. 25, 2009

(51) Int. Cl.
*F16L 1/12* (2006.01)
(52) U.S. Cl. .................... 405/172; 405/169; 405/158
(58) Field of Classification Search ......... 405/169, 405/170, 166, 158, 168.3, 172
See application file for complete search history.

(56) References Cited

U.S. PATENT DOCUMENTS

| | | | | |
|---|---|---|---|---|
| 3,846,992 | A * | 11/1974 | Liautaud ................ | 405/169 |
| 4,086,778 | A * | 5/1978 | Latham et al. ........... | 405/169 |
| 4,133,182 | A | 1/1979 | Chateau | |
| 4,277,202 | A | 7/1981 | Archambaud et al. | |
| 4,422,799 | A * | 12/1983 | Green et al. ............ | 405/169 |
| 4,445,804 | A * | 5/1984 | Abdallah et al. ......... | 405/169 |
| 4,457,378 | A | 7/1984 | Watkins | |
| 4,702,646 | A * | 10/1987 | Morris .................. | 405/169 |
| 5,807,027 | A | 9/1998 | Ostergaard | |
| 6,082,391 | A * | 7/2000 | Thiebaud et al. ........ | 405/224.1 |
| 6,409,428 | B1 * | 6/2002 | Moog ................... | 405/169 |
| 7,430,979 | B2 * | 10/2008 | Baird .................... | 405/158 |
| 2002/0129755 | A1 * | 9/2002 | Hagen et al. ............. | 114/268 |
| 2005/0196243 | A1 * | 9/2005 | Pollock et al. .......... | 405/224.3 |
| 2006/0067792 | A1 * | 3/2006 | Joshi et al. ............. | 405/169 |
| 2006/0283369 | A1 * | 12/2006 | Baird .................... | 114/244 |
| 2008/0056825 | A1 * | 3/2008 | Joshi et al. ............. | 405/170 |

FOREIGN PATENT DOCUMENTS

WO        2005/028810        3/2005

* cited by examiner

*Primary Examiner*—Frederick L Lagman
(74) *Attorney, Agent, or Firm*—Locke Lord Bissell & Liddell LLP

(57) ABSTRACT

The disclosure provides a system and method for installing subsea equipment, such as a pipeline and equipment associated therewith in a target area, generally having restricted overhead access. An anchor can be installed in the seabed and can include one or more sheaves. A pipeline can be provided, which can include related equipment and/or one or more coupling devices situated remotely from the anchor relative to the target area. A winch wire can be provided and is adapted to be directly or indirectly coupled across at least a portion of the target area to the pipeline. A transfer sling having a pull wire and an initiation wire can be coupled between the winch wire and pipeline to assist the winch wire pulling the pipeline into the target area and transferring a pipeline force from the sheave to the anchor independent of the sheave.

21 Claims, 17 Drawing Sheets

SYSTEM AND METHOD FOR INSTALLING A SUBSEA PIPELINE

CROSS REFERENCE TO RELATED APPLICATIONS

Not applicable.

STATEMENT REGARDING FEDERALLY SPONSORED RESEARCH OR DEVELOPMENT

Not applicable.

REFERENCE TO APPENDIX

Not applicable.

BACKGROUND OF THE INVENTION

1. Field of the Invention

The inventions disclosed and taught herein relate generally to installing subsea pipelines; and more specifically relate to installing subsea pipelines where the location of an installation vessel is restricted.

2. Description of the Related Art

Deep sea well operations often include the establishment of a subsea station on the seabed, or sea floor, which may serve as a collecting or assembly point for a plurality of subsea devices, such as pipelines. Prior systems exist for installing subsea stations and for coupling components thereto. Some of the prior systems are limited to depths at which divers may be used. Others are directed to diverless applications and propose various systems for accomplishing the positioning and connecting of subsea components. A known procedure is to use a first surface support to lower a subsea system to the seabed. The subsea system has a pulley around which a hauling cable is wound and connected to a winch on the surface support. After placement of the subsea system, a loose end of the cable is hauled by a surface vessel to second surface support holding the pipeline, where the loose end is attached to the pipeline. The winch is activated and pulls the pipeline to the subsea system with the pulley. With this procedure, at least two aspects occur. First, surface access is needed between the different surface supports and the surface vessel to manage the connections between the subsea system, the pipeline, and the hauling cable. Second, catenary forces from the pipeline weight remain on the pulley during the operation as the pipeline is lowered into position. The pulley must be sized to withstand such forces. The construction and sizing is generally considered expensive and necessarily complicated. Likewise, the hauling cable is sized to withstand such forces and further adds to the costs of the operation. In some prior art systems, the hauling cable can be about 65 mm in diameter of more expensive synthetic material and are commonly 3000 meters long or more depending on the depth to the seabed and the distance to travel downward through the pulley and upward to the pipeline.

Another procedure is to lower a sled to the seabed, where the sled is connected to flowlines and contains a detachable frame with a winch. An overhead surface vessel lowers a riser string to the sled and connects to the frame, then lifts out the frame with the winch. The overhead surface vessel then moves into a position overhead of a nearby wellhead and lands the frame on the wellhead. The frame is connected to the sled with cables. The winch on the frame is operated remotely from the surface vessel with umbilical hydraulic lines to pull the sled and hence flowlines to the wellhead. An upper portion of the frame is disconnected, leaving the cables and equipment of a lower portion of the frame down on the wellhead. A series of valves are landed on the lower portion to connect the flowlines to the well. The operation involves overhead access to perform the various connections, requires expense from the various equipment and umbilical cords, and adds the additional complication to operate the winch remotely from the surface.

Often times, subsea stations exist on the seabed below some surface facility, such as a vessel, drilling rig, production facility or the like. When the desire exists to install a pipeline or to otherwise access a subsea station, the surface facility above may restrict access, such as by limiting the positioning of a pipelay or installation vessel. In such a scenario, desired access to the subsea station or other target area from the sea's surface directly above may be restricted or unavailable and the above procedures may be unsatisfactory for such operations, besides having the other previously mentioned disadvantages of known procedures.

Therefore, there remains a need to provide a more efficient system and method for installing subsea equipment.

BRIEF SUMMARY OF THE INVENTION

The disclosure herein is directed to a system and method for installing subsea equipment, such as a pipeline and equipment associated therewith in a target area, generally having restricted overhead access. An anchor can be installed in the seabed and can include one or more sheaves or coupling devices. A pipeline can be provided, which can include related equipment and/or one or more coupling devices situated remotely from the anchor relative to the target area. A winch wire can be provided and is adapted to be directly or indirectly coupled across at least a portion of the target area to the pipeline. A transfer sling and initiation wire can be coupled between the winch wire and pipeline to assist the winch wire pulling the pipeline across the target area. At least a portion of the pipeline can be coupled to the anchor and/or positioned within a target area on the seabed.

The disclosure provides a pipeline installation system for installing a pipeline in a target area, such as on a seabed, including an anchor installed in the seabed, the anchor having a sheave coupled thereto. At least a portion of the pipeline can have a first end, which can have a transfer sling coupled thereto. A winch wire can be coupled to the transfer sling and can be adapted to engage the sheave to pull at least the first end toward the target area.

The disclosure also provides a method for installing a pipeline in a target area on a seabed, including installing an anchor in the seabed, the anchor having a sheave coupled thereto, and positioning a messenger wire along a desired pipeline path, the messenger wire passing between the anchor and the sheave. The method can include providing a winch wire, providing at least a portion of a pipeline having a transfer sling at a first end, and coupling the messenger wire between the winch wire and the transfer sling. The method can further include manipulating the winch wire such that at least the first end of the pipeline travels along the desired pipeline path toward the anchor and passes at least partially into the target area.

The disclosure further provides a method for installing a pipeline in a target area on a seabed, including installing an anchor in the seabed, the anchor having a sheave coupled thereto, and providing at least a portion of a pipeline having a first end. The method can include coupling a transfer sling to the first end, coupling a winch wire adapted to cooperate with the sheave to the transfer sling, and manipulating the winch wire such that at least the first end of the pipeline moves toward the anchor and moves at least partially into the target area.

DETAILED DESCRIPTION

Figure 1:
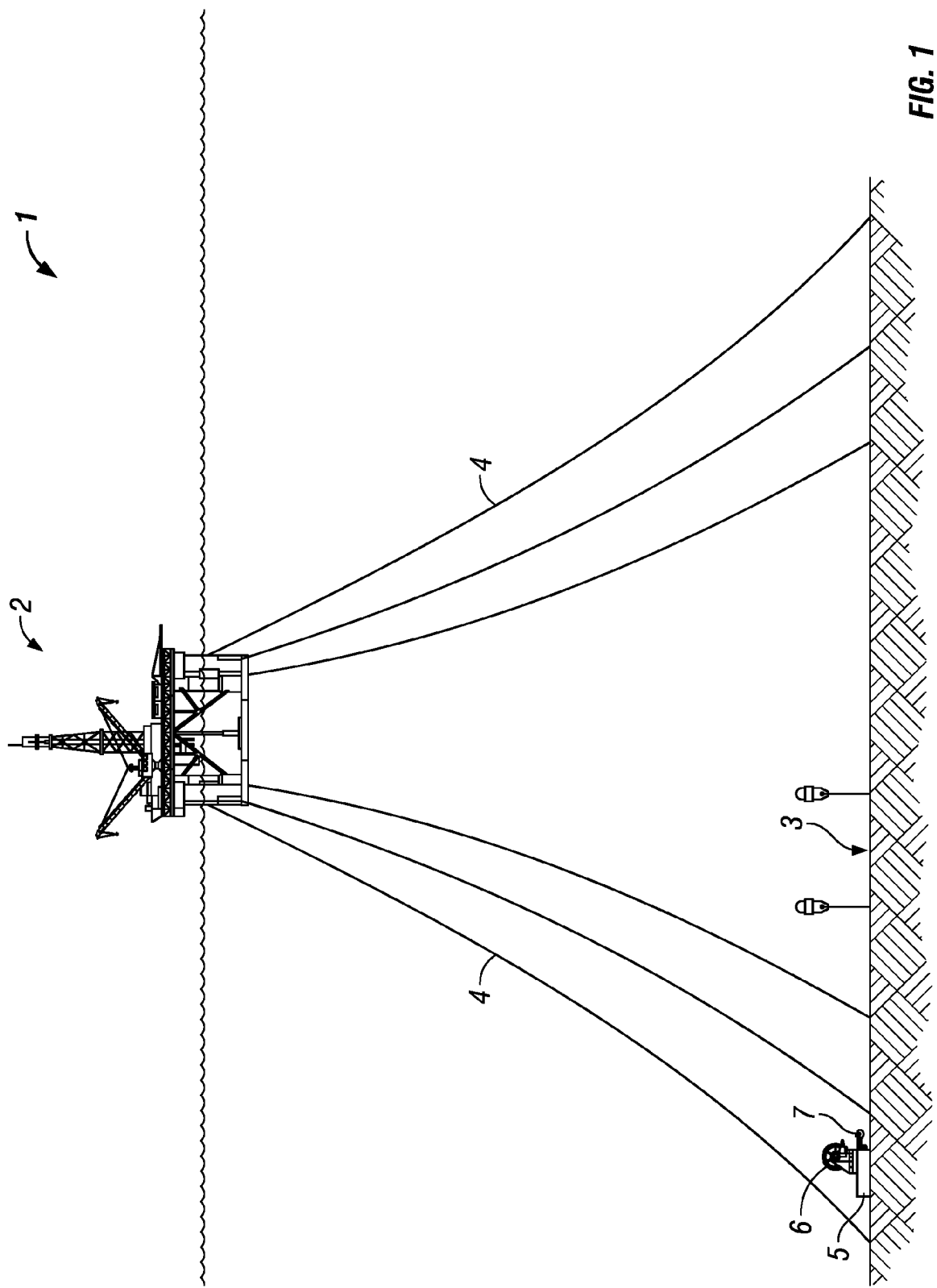
FIG. 1 is a schematic diagram of an exemplary pipeline installation system.

The Figures described above and the written description of specific structures and functions below are not presented to limit the scope of what Applicants have invented or the scope of the appended claims. Rather, the Figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present inventions will require numerous implementation-specific decisions to achieve the developer's ultimate goal for the commercial embodiment. Such implementation-specific decisions can include, and likely are not limited to, compliance with system-related, business-related, government-related and other constraints, which can vary by specific implementation, location and from time to time. While a developer's efforts might be complex and time-consuming in an absolute sense, such efforts would be, nevertheless, a routine undertaking for those of skill this art having benefit of this disclosure. It must be understood that the inventions disclosed and taught herein are susceptible to numerous and various modifications and alternative forms. Lastly, the use of a singular term, such as, but not limited to, "a," is not intended as limiting of the number of items. Also, the use of relational terms, such as, but not limited to, "top," "bottom," "left," "right," "upper," "lower," "down," "up," "side," and the like are used in the written description for clarity in specific reference to the Figures and are not intended to limit the scope of the invention or the appended claims. Furthermore, the term "coupled," "coupling," "coupler," and like terms are used broadly herein and can include any method or device for securing, binding, bonding, fastening, attaching, joining, inserting therein, forming thereon or therein, communicating, or otherwise associating, for example, mechanically, magnetically, electrically, chemically, directly or indirectly with intermediate elements, one or more pieces of members together and can further include without limitation integrally forming one functional member with another in a unity fashion. The coupling can occur in any direction, including rotationally.

The inventions disclosed and taught herein directed to a system and method for installing subsea equipment, such as a pipeline and equipment associated therewith. An anchor can be installed in the seabed and can include one or more sheaves or coupling devices. A pipeline can be provided, which can include related equipment, such as fittings, valves or one or more coupling devices. A winch wire can be provided and can be adapted to cooperate with other components, such as the sheave or coupling devices. At least a portion of the pipeline can be coupled to the anchor and/or positioned in a target area on the seabed.

FIG. 1 is a schematic diagram of an exemplary pipeline installation system. A surface facility 2, such as a drilling rig or production facility, can exist above a target area 3 located on the seabed and can restrict access to the target area 3. The target area 3 can or cannot include existing structures, such as equipment or other facilities. The target area 3 can exist at any depth. The surface facility 2 can float independently, can be atop a support structure, or can be fixed to the seabed such as by one or more mooring lines 4. Further, an initiation anchor 5 can be provided on the seabed, for example, at a position proximate to the target area 3 or at some other desired position. For purposes herein, an anchor can include a pile (such as a driven or suction pile), heavy weight, structure having a resistance portion embedded into the seabed, or other structures that substantially resist movement relative to the seabed. A sheave 6 and/or a coupling 7 can be coupled to the anchor 5. As described herein, the anchor 5 can be used to pull and install a pipeline under the surface facility 2 into the target area 3.

Figure 2:
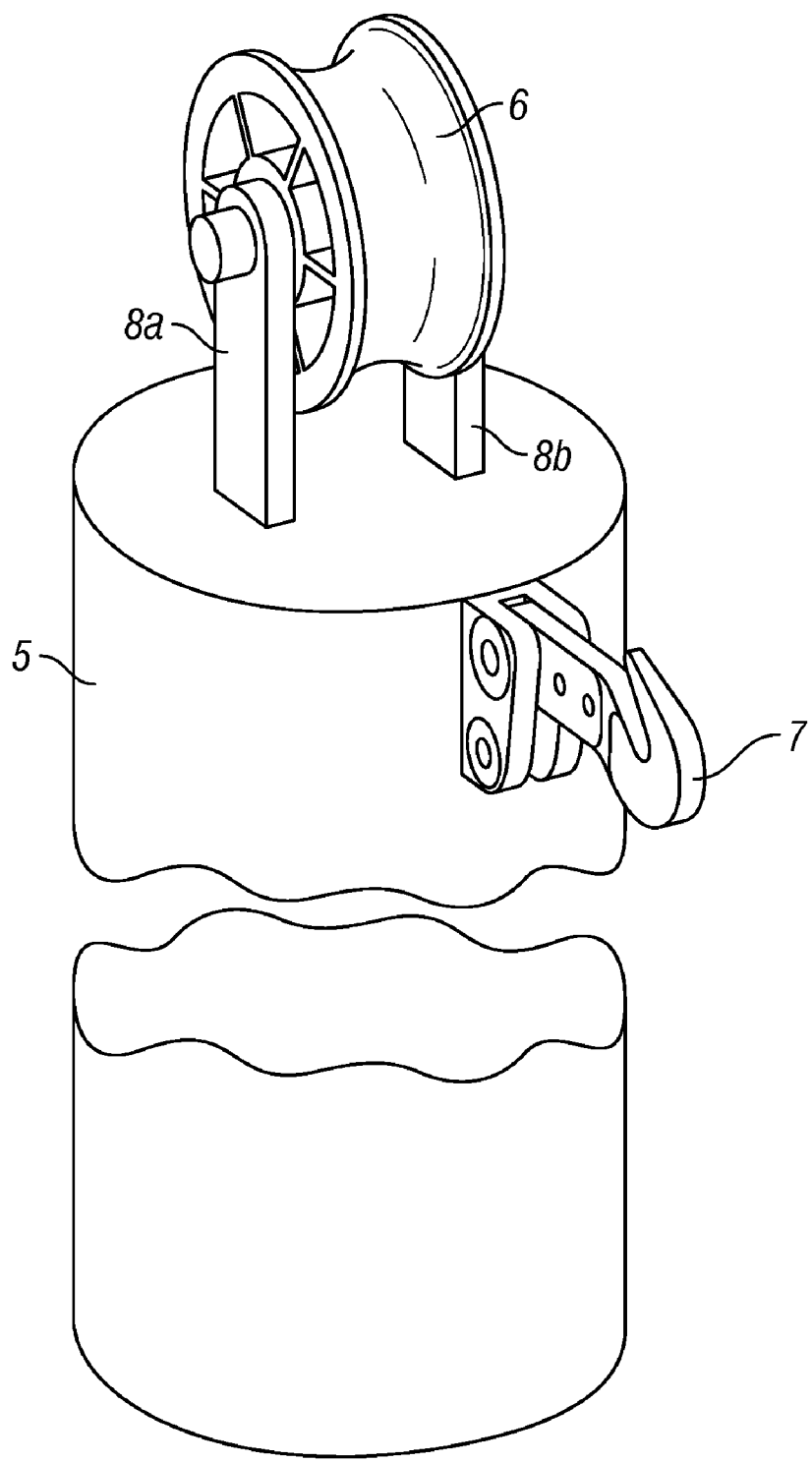
FIG. 2 is a schematic diagram of a detailed portion of the exemplary pipeline installation system, showing an anchor with a sheave.

FIG. 2 is a schematic diagram of a detailed portion of the exemplary pipeline installation system, showing an anchor 5 with a sheave 6. The anchor 5 can be fixed to the seabed, such as by driving the anchor 5 into the seabed or through other appropriate means. The sheave 6 can include, for example, a pipe, pulley, roller, or similar device coupled to the top or side of the anchor 5, such as being coupled between two parallel posts 8a, 8b. One or more wires, described herein, can be pulled or otherwise manipulated through the sheave to change the angle of the wire, such as from an angle substantially horizontal (less than 45 degrees from a horizontal plane) to an angle substantially vertical (greater than 45 degrees from the horizontal plane). Further, the coupling 7 can be coupled to the top or side of the anchor 5 and can include for example a hook, cleat, yoke, loop, clevis, or attachment device.

Figure 3:
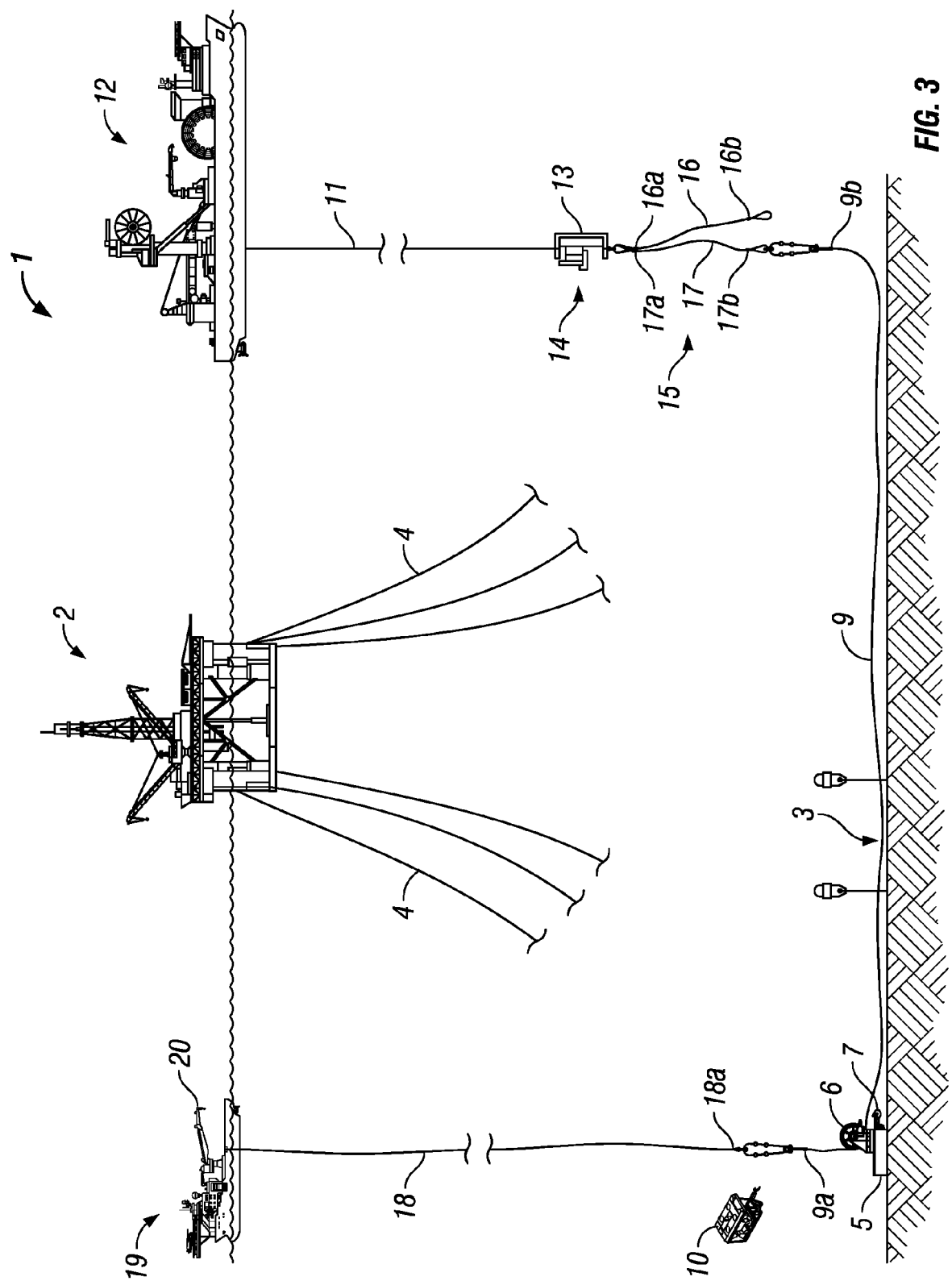
FIG. 3 is a schematic diagram of the exemplary pipeline installation system, showing a winch wire and pipeline to be positioned in a target area.

FIG. 3 is a schematic diagram of the exemplary pipeline installation system, showing a winch wire 18 and a pipeline 11 to be positioned in the target area 3. A messenger wire 9 can be positioned on or proximate to the seabed, such as through the use of a diver or remotely operated vehicle 10 ("ROV"), wherein a first end 9a can pass between the anchor 5 and the sheave 6. A second end 9b of the messenger wire 9 can be positioned some desired distance from the anchor 5. A length of the messenger wire 9 can pass, for example, at least partially across the target area 3 and can define a desired path for installation of the pipeline 11. The path can be chosen based on a variety of factors, such as avoiding interference with mooring lines 4 or other equipment in the vicinity of the target area 3, or other considerations relevant to a particular application.

The pipeline 11 can be provided, such as by a pipelay vessel 12. The pipeline 11 can be one or more pipe joints, tubes, flowlines, or other conduits and can be continuous or jointed, and can include other devices such as connectors or valves. As another example, the pipeline 11 can include an end termination 13, temporary or not, including a pipeline end terminal ("PLET"), manifold, pipeline connector, equipment for connecting a pipeline to a subsea junction, such as a wellhead or Christmas tree, and so forth. The end termination can include an assembly of any number of components relevant to a particular application. The term "pipeline" is used broadly herein and, unless otherwise indicated, can include any or all of the above, singularly or in combination, in whole or in part.

Furthermore, the system 1 can include one or more installation coupling devices, such as a transfer sling 15. The transfer sling generally has at least two portions, including an initiation wire 16 and a pull wire 17. The initiation wire 16 has a first end 16a and a second end 16b. The pull wire 17 has a first end 17a and a second end 17b. Generally, the ends 16a and 17a are coupled to the pipeline 11, such as at an end 14 of the pipeline that can be coterminous with the end termination 13, if present.

Advantageously, the second ends 16b and 17b are used to transfer the load from the sheave 6 to the anchor 5 during a transfer procedure that differs from earlier procedures and lessens the forces on the sheave. The transfer sling and transfer procedure also reduces the need for complex subsea winch configurations, expensive large diameter cabling to pull the pipeline, expensive and complex pulley assemblies, and other advantages, as explained below.

The term "wire" in messenger wire, pull wire, initiation wire, and other such references to wire are used broadly herein to refer to rope, cable, wire, cable, bar, chain, or similar tension-supporting devices. The wire can have appropriate coupling devices generally at its ends that are suitable for attachment to the devices or structures to which it is designated to be attached. Further, the wire can be adapted to be engaged with a ROV 10, a crane on a surface support vessel, a sheave, anchor, pipeline, and other structures or devices. A winch wire 18 is generally also provided, such as by a support vessel 19, which can have a winch or other device for manipulating the winch wire 18. The support vessel can also have a crane 20 for manipulating devices and structures on board or subsea. Generally, the winch wire 18 is positioned remotely from the pipeline 11 relative to the target area 3 as described herein, but can be positioned at any appropriate position.

In the operation of the exemplary embodiment of FIG. 3, the messenger wire 9 can be laid across the seabed between the anchor 5 and the first end 14 of the pipeline and generally can cross into at least a portion of the target area 3. A first end 9a of the messenger wire 9 can be routed between the anchor 5 and sheave 6. The winch wire can be lowered in proximity to the messenger wire 9. Similarly, a second end 9b of the messenger wire 9 can be positioned proximate to the end 17b of the pull wire 17 of the transfer sling 15. Alternatively, the winch wire 18 can be routed between the anchor 5 and sheave 6 and can be positioned proximate to the messenger wire end 9a and coupled thereto.

Once the various components are positioned, the end 9a of the messenger wire 9 can be coupled to the winch wire 18, and the end 9b can be coupled to the end 17b of the pull wire 17 of the transfer sling 15. Any known means can be used, separately or in combination, to position and/or couple the components described herein. For example, a ROV 10, one or more divers, or other means available in a particular application can be used, which can depend on any of a host of factors, such as costs or the depth of water in which operations are taking place. Alternatively, this disclosure contemplates routing the winch wire 18 between the anchor 5 and sheave 6, and coupling an end of the winch wire 18 directly to the transfer sling 15. Such embodiments, for example, can forego the use of a messenger wire 9 when desired, which can reduce costs or produce other benefits. Decisions as to which embodiments are appropriate can be application specific and can turn on factors such as, for example, loads, wire length, water depth, or other relevant considerations.

Figure 4:
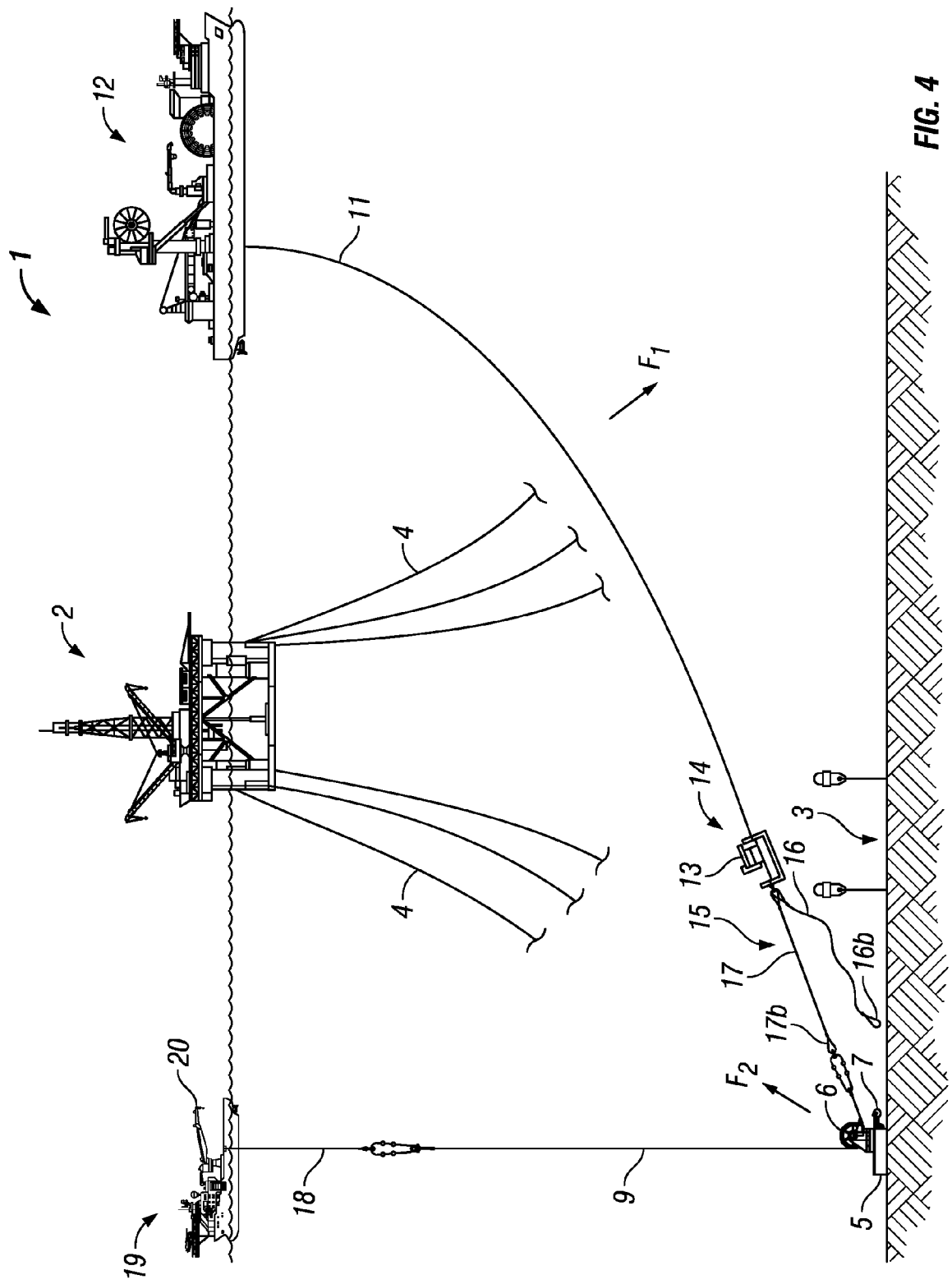
FIG. 4 is a schematic diagram of the exemplary pipeline installation system, showing the pipeline being positioned in the target area.

FIG. 4 is a schematic diagram of the exemplary pipeline installation system, showing the pipeline being positioned in the target area. The winch wire 18 can be manipulated, such as by winching, pulling, or like means, in cooperation with the sheave 6 to pull the messenger wire 9. Pulling the messenger wire 9 in turn pulls the pull wire 17 of the transfer sling 15 that in turn pulls the pipeline 11. A pipeline force F1 due to the weight of the pipeline and other forces cause a resulting sheave force F2 on the sheave 6 from pulling with the winch wire 18. The end 14 of the pipeline can travel along a desired pipeline path, such as into the target area 3. Alternatively, the winch wire 18 can pull the transfer sling 15 directly, when use of the messenger wire 9 is prevented or otherwise undesirable. Generally, the winch wire 18 is manipulated such that the end 14 is proximate enough to the anchor 5 to allow a free end 16b of the initiation wire 16 to be coupled to the anchor 5, such as via the coupling 7, as further described in FIG. 5.

Figure 5:
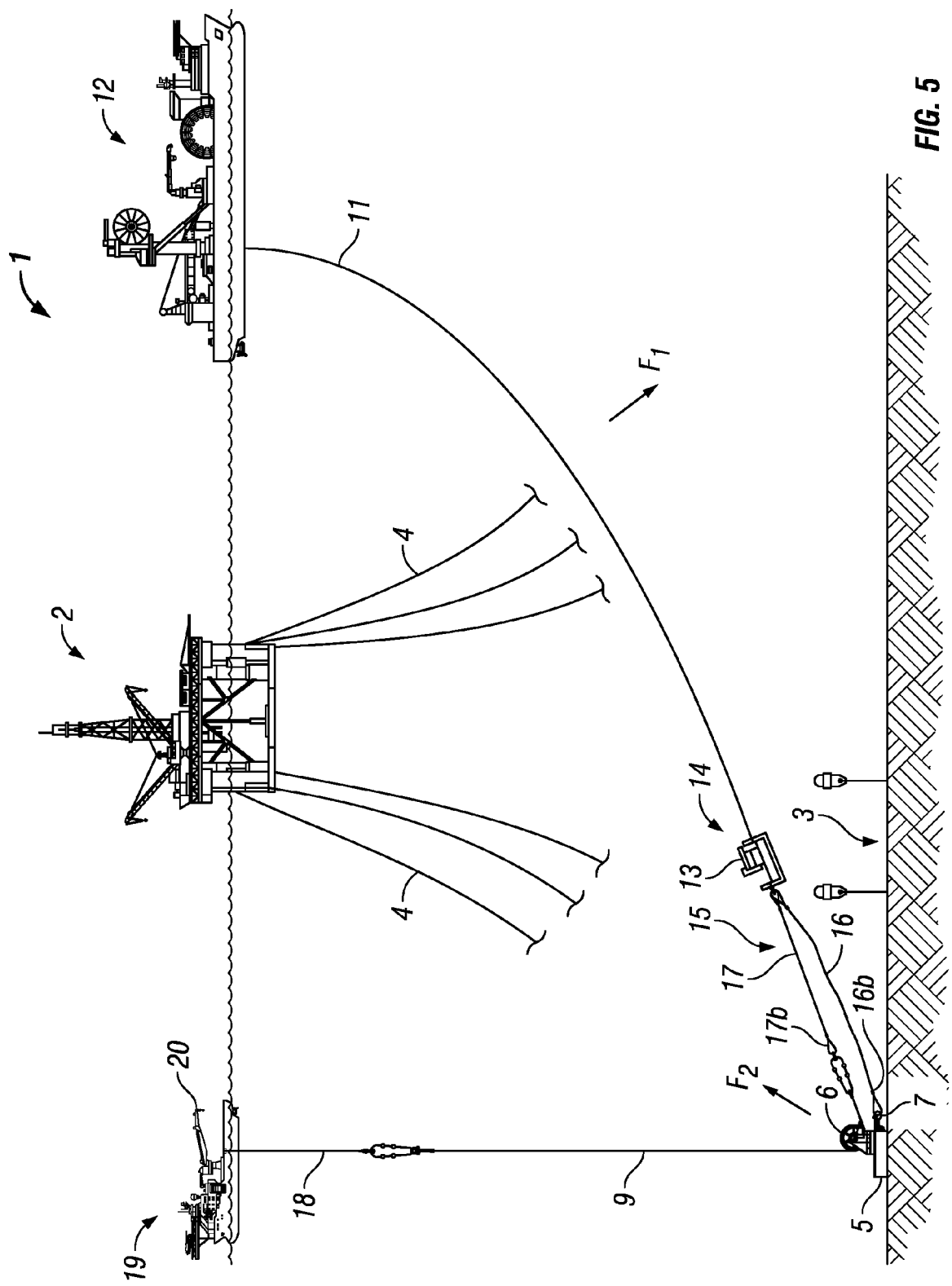
FIG. 5 is a schematic diagram of the exemplary pipeline installation system, showing the initiation wire coupled to the anchor with the pull line taut.

FIG. 5 is a schematic diagram of the exemplary pipeline installation system, showing the initiation wire coupled to the anchor with the pull line taut. The winch wire 18 can be manipulated in cooperation with the sheave 6 to pull the transfer sling 15 in proximity to the anchor 5. When proximate to the anchor, the free end 16b of the initiation wire 16 can be coupled to the anchor 5. Any number of means can be used to accomplish the coupling, including an ROV and other means described above. The pipeline force F1 is still being applied to the sheave to create the sheave force F2 because the winch wire 18 is maintaining the pull wire 17 taut.

Figure 6:
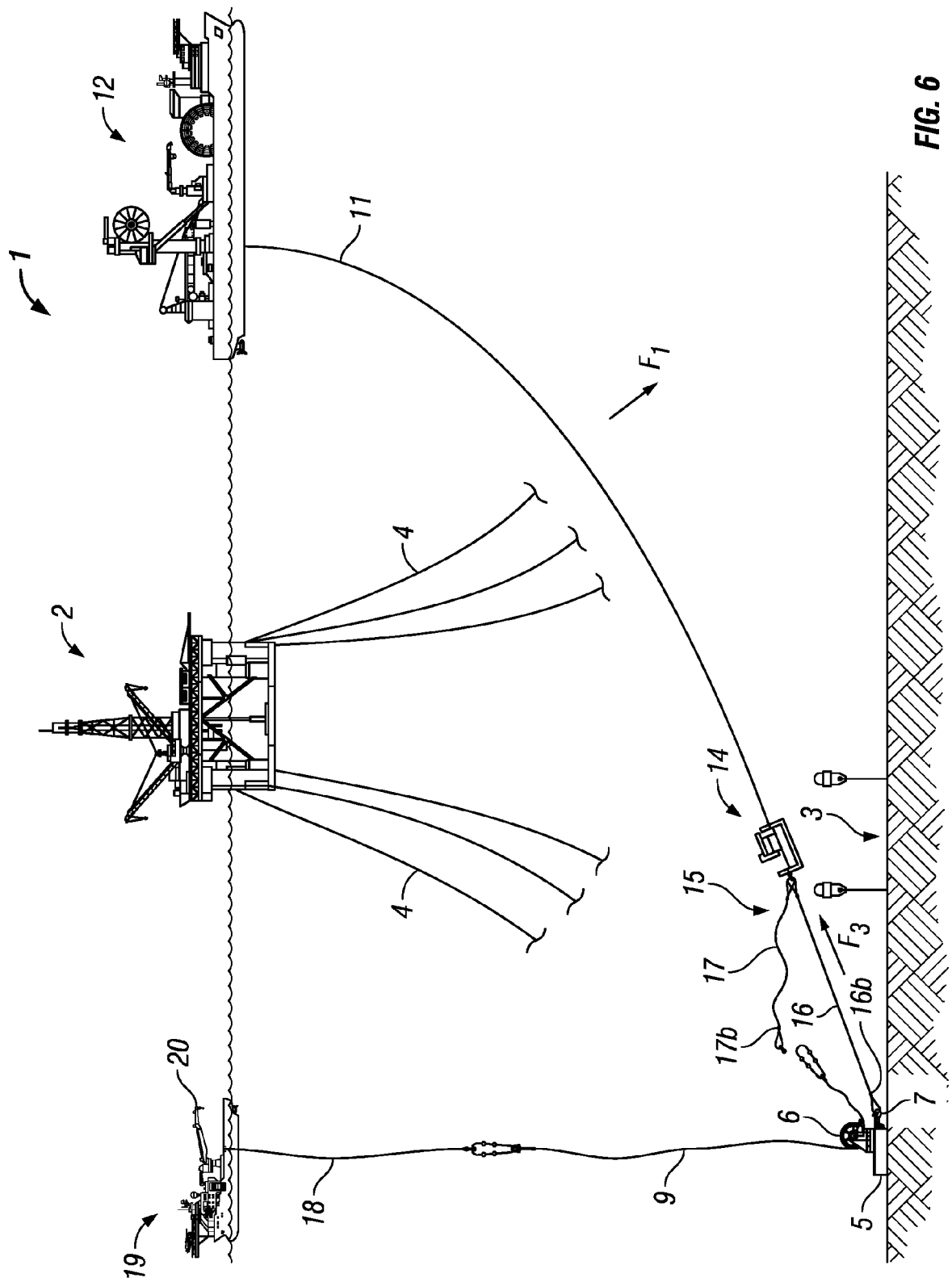
FIG. 6 is a schematic diagram of the exemplary pipeline installation system, showing the initiation wire coupled to the anchor with the pull line loose so that the pipeline force is transferred to the anchor from the pulley.

FIG. 6 is a schematic diagram of the exemplary pipeline installation system, showing the initiation wire coupled to the anchor with the pull line loose so that the pipeline force is transferred to the anchor from the pulley. Once the initiation wire 16 is coupled to the anchor 5, the winch wire 18 can be loosed to create a slack on the messenger wire 9, if used, and the pull wire 17. At that time, the pipeline force F1 is transferred to the anchor 5 and the coupling 7, if used, to create an anchor force F3 on the anchor. The slack in the pull wire 17 indicates that the pull wire 17 is no longer supporting the pipeline force F1. Thus, the initiation wire 16 is coupled to the anchor 5 to allow force F1 from the pipeline to be applied to the anchor 5 independent of the sheave 6.

Figure 7:
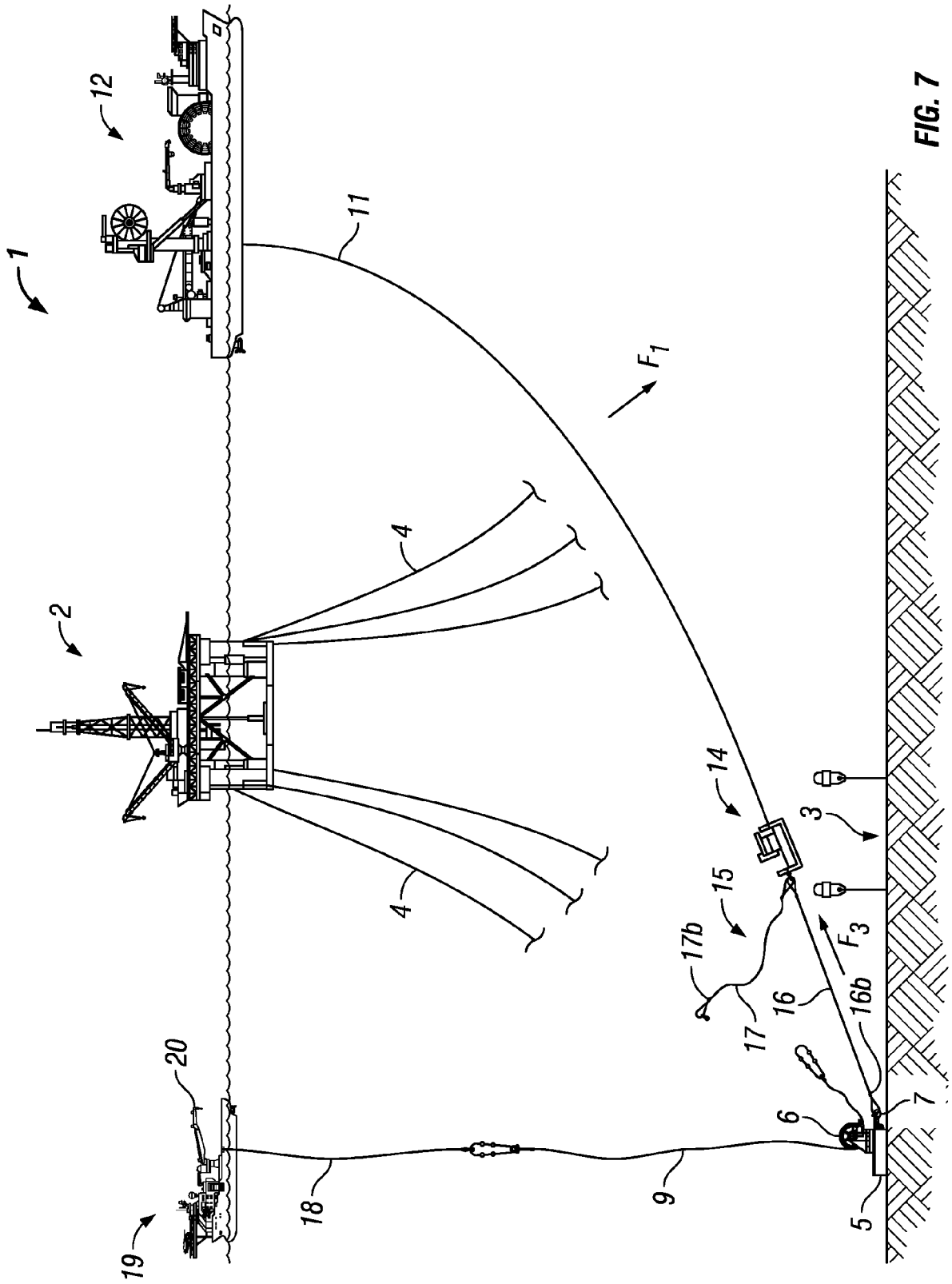
FIG. 7 is a schematic diagram of the exemplary pipeline installation system, showing the initiation wire coupled to the anchor with the pull line loose and the pipeline force transferred to the anchor from the pulley.

FIG. 7 is a schematic diagram of the exemplary pipeline installation system, showing the initiation wire coupled to the anchor with the pull line loose and the pipeline force transferred to the anchor from the pulley. With the pipeline force F1 transferred to the initiation wire 16 to create the anchor force F3, the pull wire 7 is no longer supporting the pipeline force F1. The pull wire can be uncoupled from the winch wire 18 and the messenger wire 9, if used. Generally, the initiation wire 16 will be a sufficient length, so that when it is coupled to the anchor, the end termination 13 can be placed in the target area 3.

Figure 8:
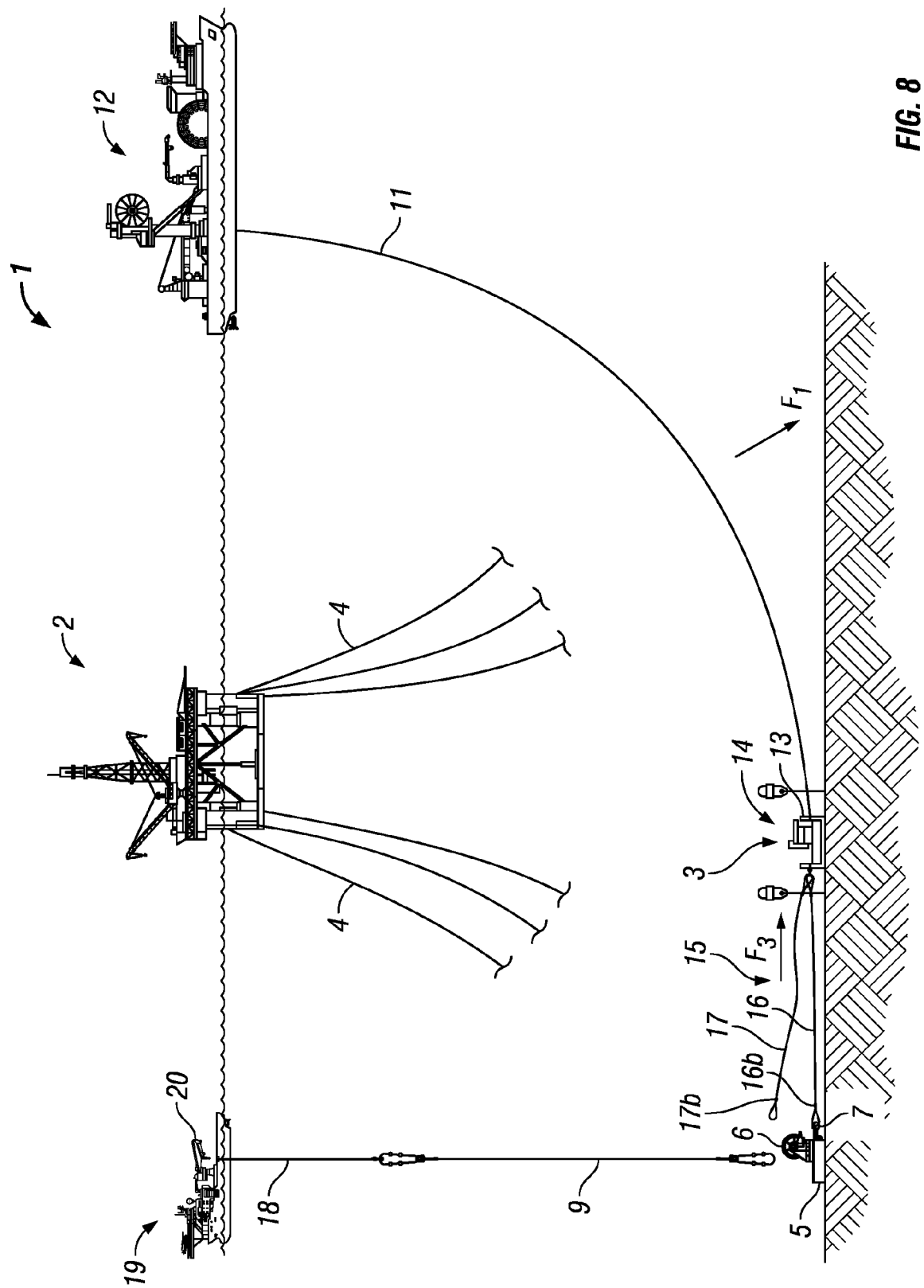
FIG. 8 is a schematic diagram of the exemplary pipeline installation system, showing the pipeline coupled to the anchor and positioned in the target area with the pipeline force on the anchor and the winch wire, through the messenger wire, uncoupled from the pull wire.

FIG. 8 is a schematic diagram of the exemplary pipeline installation system, showing the pipeline coupled to the anchor and positioned in the target area with the pipeline force on the anchor. The winch wire, through the messenger wire, is shown uncoupled from the pull wire. The pipeline 11 can be laid to the seabed with the anchor 5 through the coupling 7 holding the pipeline 11 in a proper position. The end termination is shown positioned in the target area 3. This positioning can allow, for example, connections to be made or can allow for other aspects of pipeline installation or initiation to take place for a particular application. The anchor force F3 is directed to the anchor rather than the sheave 6 and allows a simplification and lighter structure to be designed for the sheave 6, because it does not support the maximum forces on the anchor after the transfer.

As the pipeline 11 is lowered to the seabed and the angle changes from an initial vertical direction in FIG. 3 to a more horizontal direction in FIG. 8, it is known that a significantly greater force is exerted on the anchor and related assembly rather than simply pulling the pipeline over to the anchor. Thus, the initiation wire 16 and the coupling 7 to the anchor 5 will generally need to support more force than the winch wire 18, messenger wire 9, pull wire 17, and the sheave 6, especially as the pipeline 11 is further lowered to the seabed. For illustrative purpose only and without limitation, the initiation wire can be about 65 mm in diameter of synthetic material of about 10 meters long while the winch wire 18, messenger wire 9, and pull wire 17 can be about 25 mm in diameter of any suitable wire of thousands of meters long. Thus, the sizes can be significantly different, in contrast to some prior procedures. The economic savings of using a smaller and potentially non-synthetic material and equipment, connections, and handling for the majority of the wire can be enormous.

In some embodiments, a crane on a surface vessel can manipulate a crane wire to assist initial efforts in coupling the winch wire to ultimately the pipeline with the various wires disposed therebetween. Further, an intermediate wire can be used to assist the various connections between the winch wire and messenger wire. FIGS. 9-18 illustrate such a variation to the general procedure described above.

Figure 9:
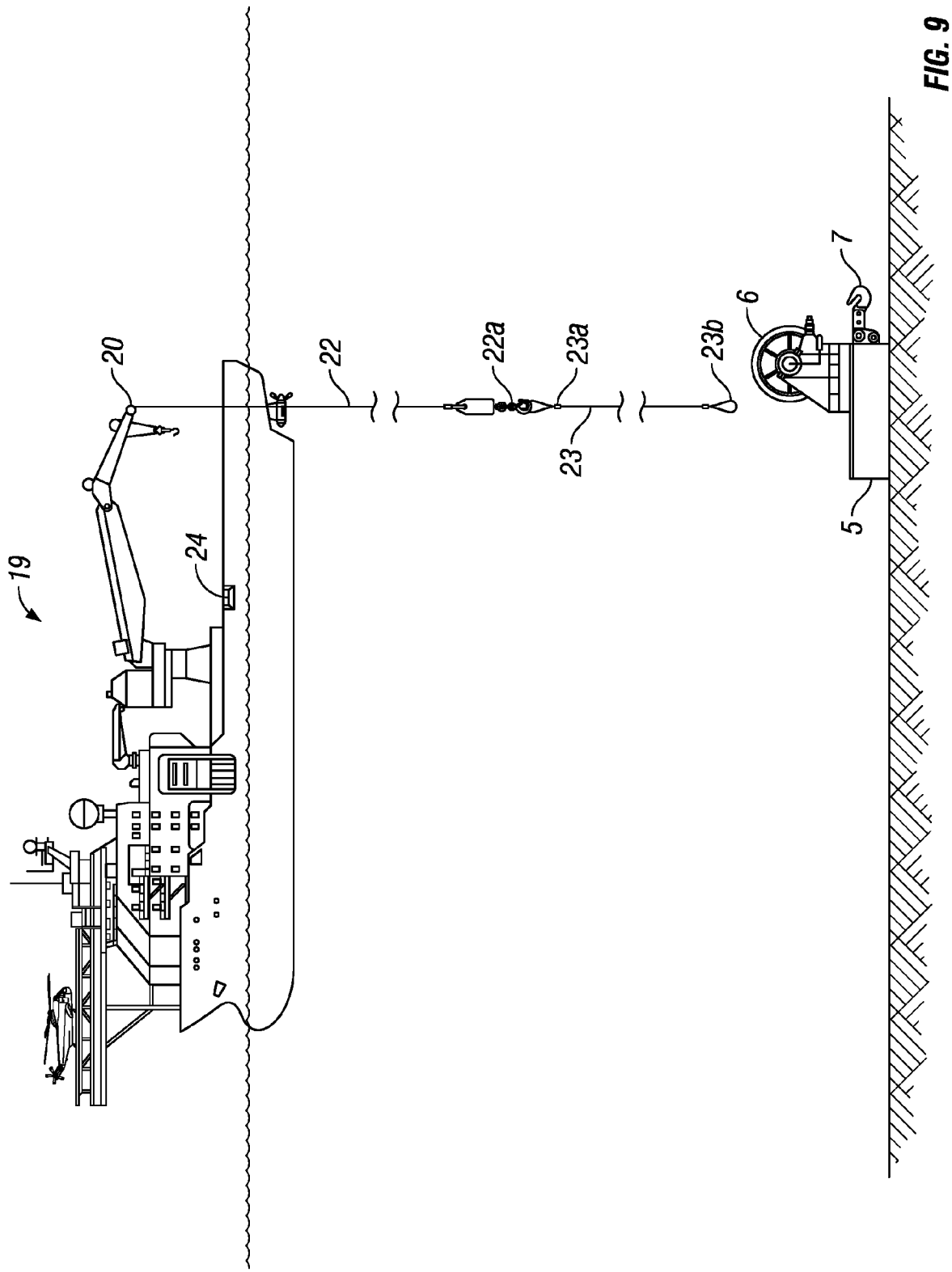
FIG. 9 is a schematic diagram of the exemplary pipeline installation system, showing a surface vessel with a crane, a winch, and an intermediate wire.

FIG. 9 is a schematic diagram of the exemplary pipeline installation system, showing a surface vessel with a crane, a winch, and an intermediate wire. A surface vessel 19 can include a crane 20 and a winch 24. The crane 20 has a crane wire 22 coupled to a drum and generally can rotate about an axis, and lower and raise its boom to manipulate the crane wire to different locations. The crane wire has an end 22a that often includes various hooks, swivels, shackles, and other coupling devices. It can be advantageous to attach an intermediate wire 23 having an end 23a coupled to the end 22a. The intermediate wire can be sized smaller to pass through the sheave 6 on the anchor 5 described above. To facilitate the passage through the sheave, the intermediate wire may exclude the larger coupling devices of the crane wire 22, such as crane hooks. The crane 20 can provide mobility and flexibility in locating the wires. The crane 20 can lower the crane wire 22 and the coupled intermediate wire 23 and manipulate the location of an end 23b in proximity to the sheave 6.

Figure 10:
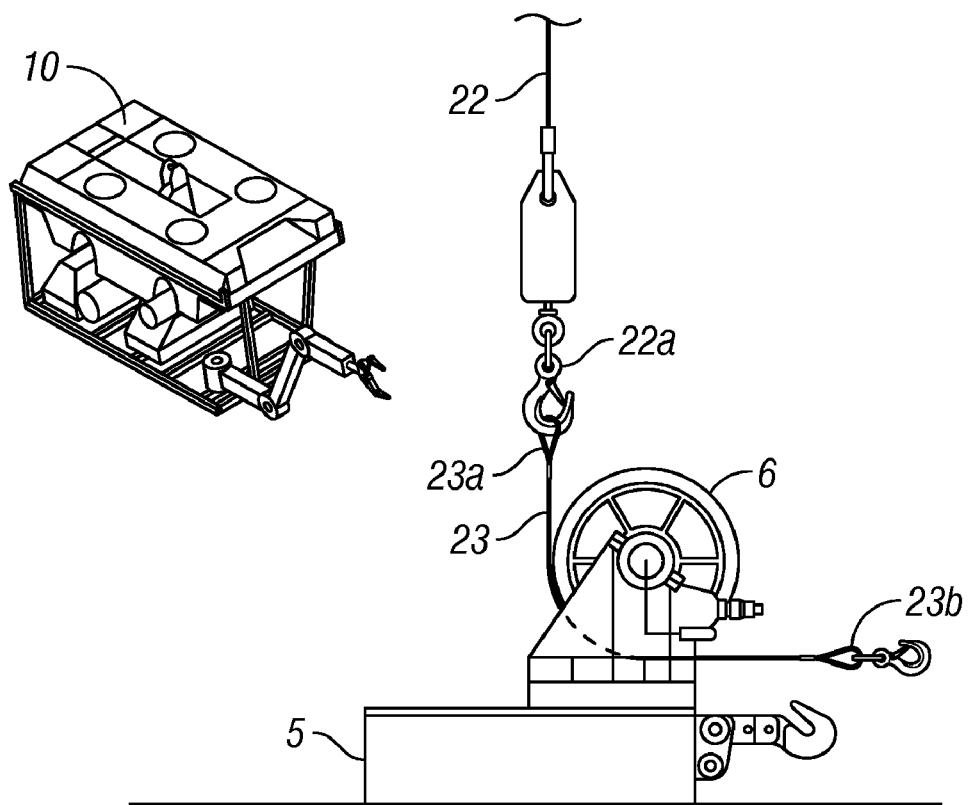
FIG. 10 is a schematic diagram of a detailed portion of the exemplary pipeline installation system, showing a crane wire, a sheave, and an intermediate wire around the sheave.

FIG. 10 is a schematic diagram of a detailed portion of the exemplary pipeline installation system, showing a crane wire, a sheave, and an intermediate wire around the sheave. An ROV 10 or other means of moving items subsea can approach the sheave 6 with the intermediate wire 23 in proximity thereto. The ROV 10 can guide the end 23b through the sheave 6 so that the end 23b can be coupled to the messenger wire described below.

Figure 11:
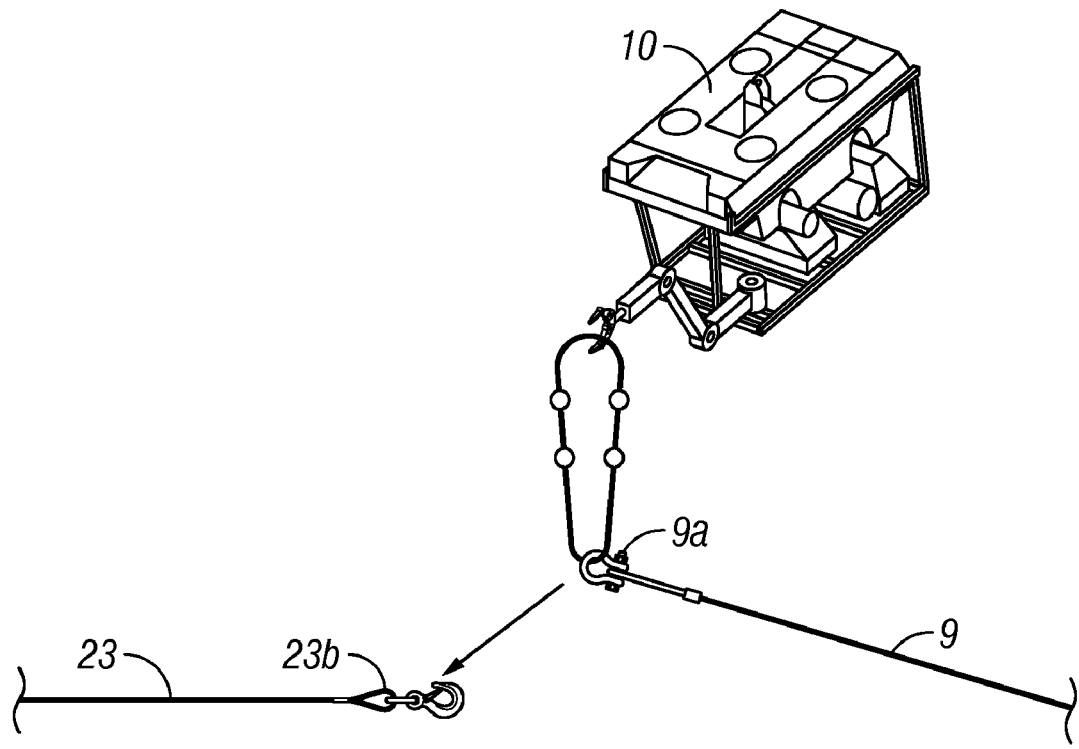
FIG. 11 is a schematic diagram of a detailed portion of the exemplary pipeline installation system, showing an ROV bringing the messenger wire to the intermediate wire.

FIG. 11 is a schematic diagram of a detailed portion of the exemplary pipeline installation system, showing an ROV bringing the messenger wire to the intermediate wire. The ROV 10 can obtain an end 9a of the messenger wire 9 laid along a desired path of the pipeline described above and bring the end 9a in proximity to the end 23b of the intermediate wire 23.

Figure 12:
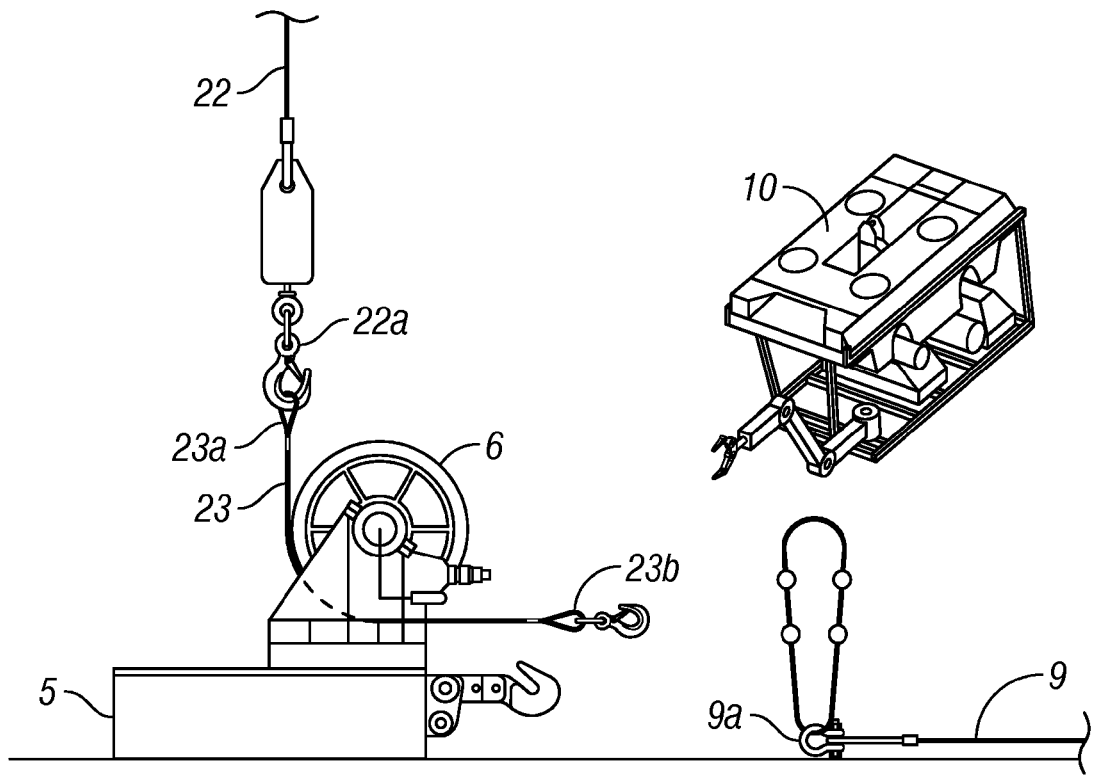
FIG. 12 is a schematic diagram of a detailed portion of the exemplary pipeline installation system, showing coupling the messenger wire to the intermediate wire.

FIG. 12 is a schematic diagram of a detailed portion of the exemplary pipeline installation system, showing coupling the messenger wire to the intermediate wire. An auxiliary coupling element such as a loop can be used to facilitate the couplings described herein. The ROV 10 can couple the end 9a of the messenger wire 9 to the end 23b of the intermediate wire 23.

Figure 13:
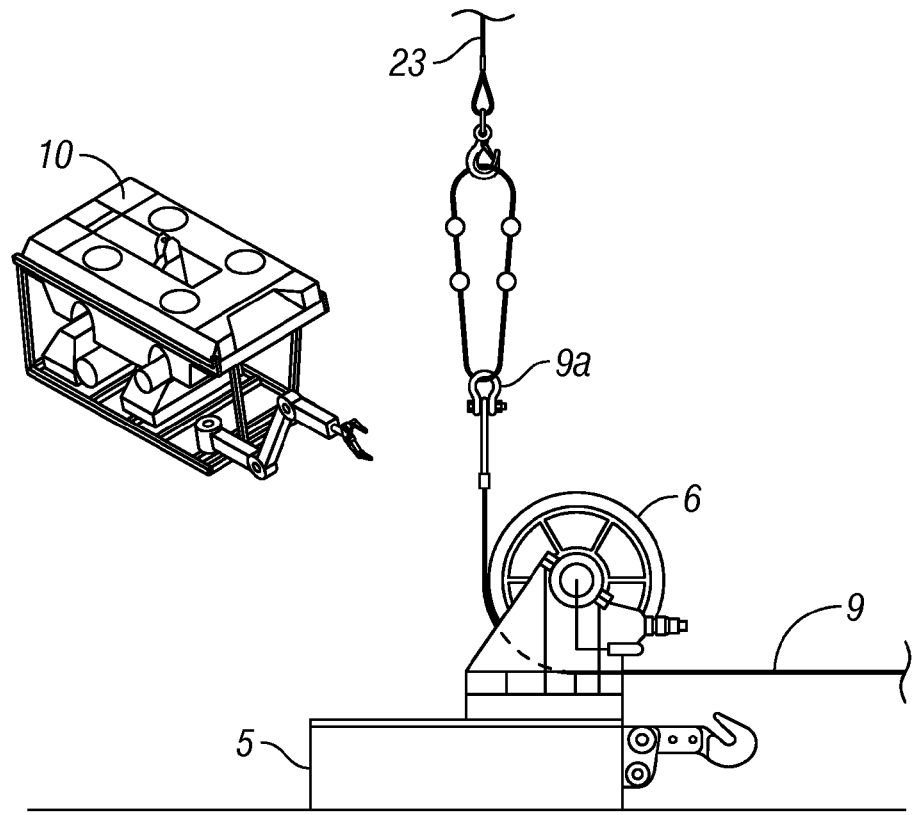
FIG. 13 is a schematic diagram of a detailed portion of the exemplary pipeline installation system, showing the intermediate wire pulled through sheave with the crane wire.

FIG. 13 is a schematic diagram of a detailed portion of the exemplary pipeline installation system, showing the intermediate wire pulled through sheave with the crane wire. The crane, described above, can reel in the crane wire to raise the intermediate wire 23 with the messenger wire coupled thereto. The size of the messenger wire end 9a is sufficiently small to allow it to pass through the sheave 6 to an elevated position above the seabed. The ROV 10 can monitor the progress as the wires are positioned with remote telemetry and cameras.

Figure 14:
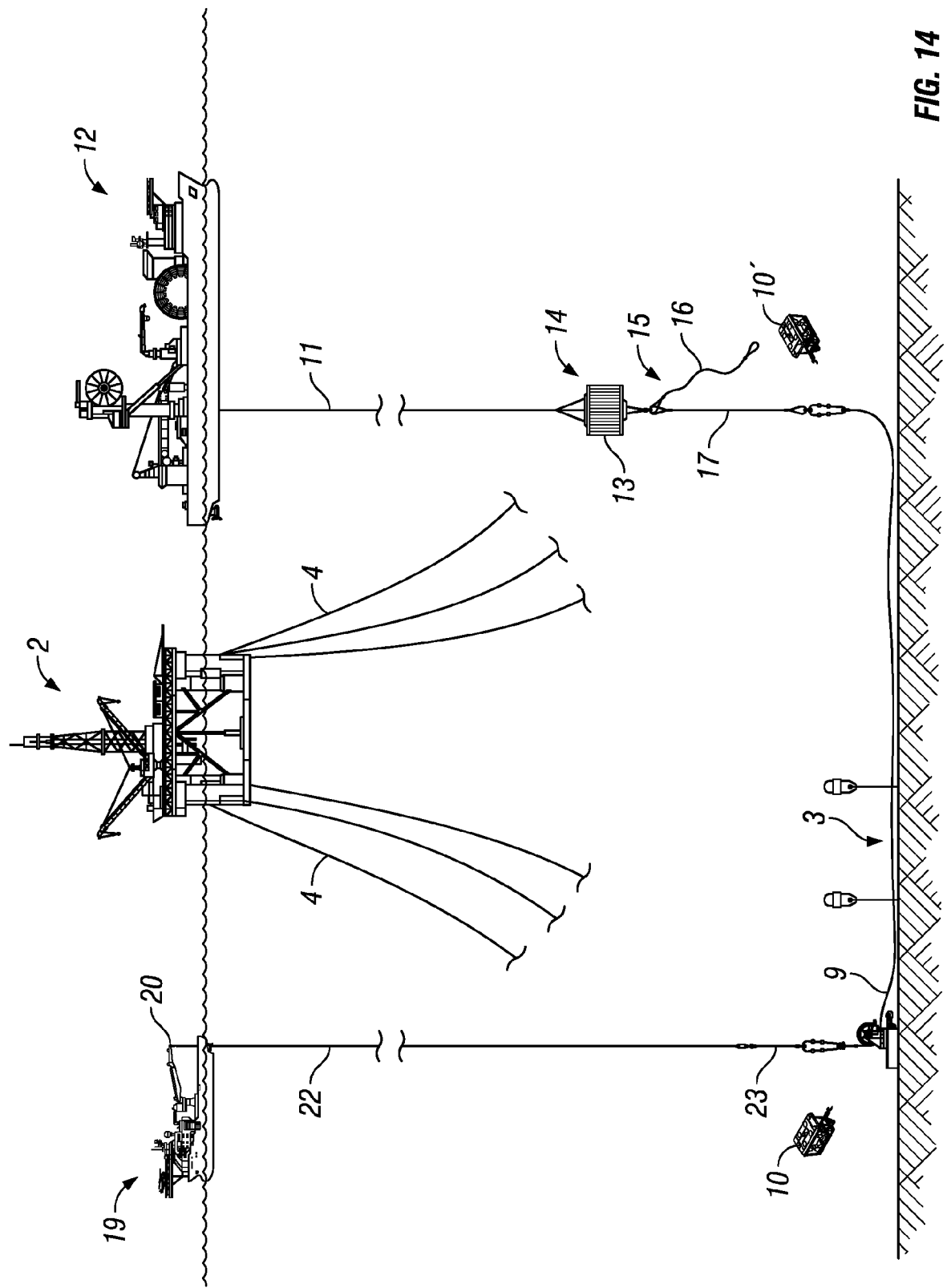
FIG. 14 is a schematic diagram of the exemplary pipeline installation system, showing an overall layout with the various elements coupled to their respective portions.

FIG. 14 is a schematic diagram of the exemplary pipeline installation system, showing an overall layout with the various elements coupled to their respective portions. If the messenger wire 9 has not already been coupled to the pipeline 11 and the end 14, then an exemplary surface vessel 12 can lower the pipeline 11 with an end 14 toward the messenger wire 9 on the seabed. An ROV 10' or other means can be used to attach the pipeline 11 with the messenger wire 9 described above. The transfer sling 15 is generally disposed between the pipeline 11 and the messenger wire as also described above. The ROV 10' can be the same or different ROV than used for the intermediate wire to messenger wire coupling and monitoring.

Figure 15:
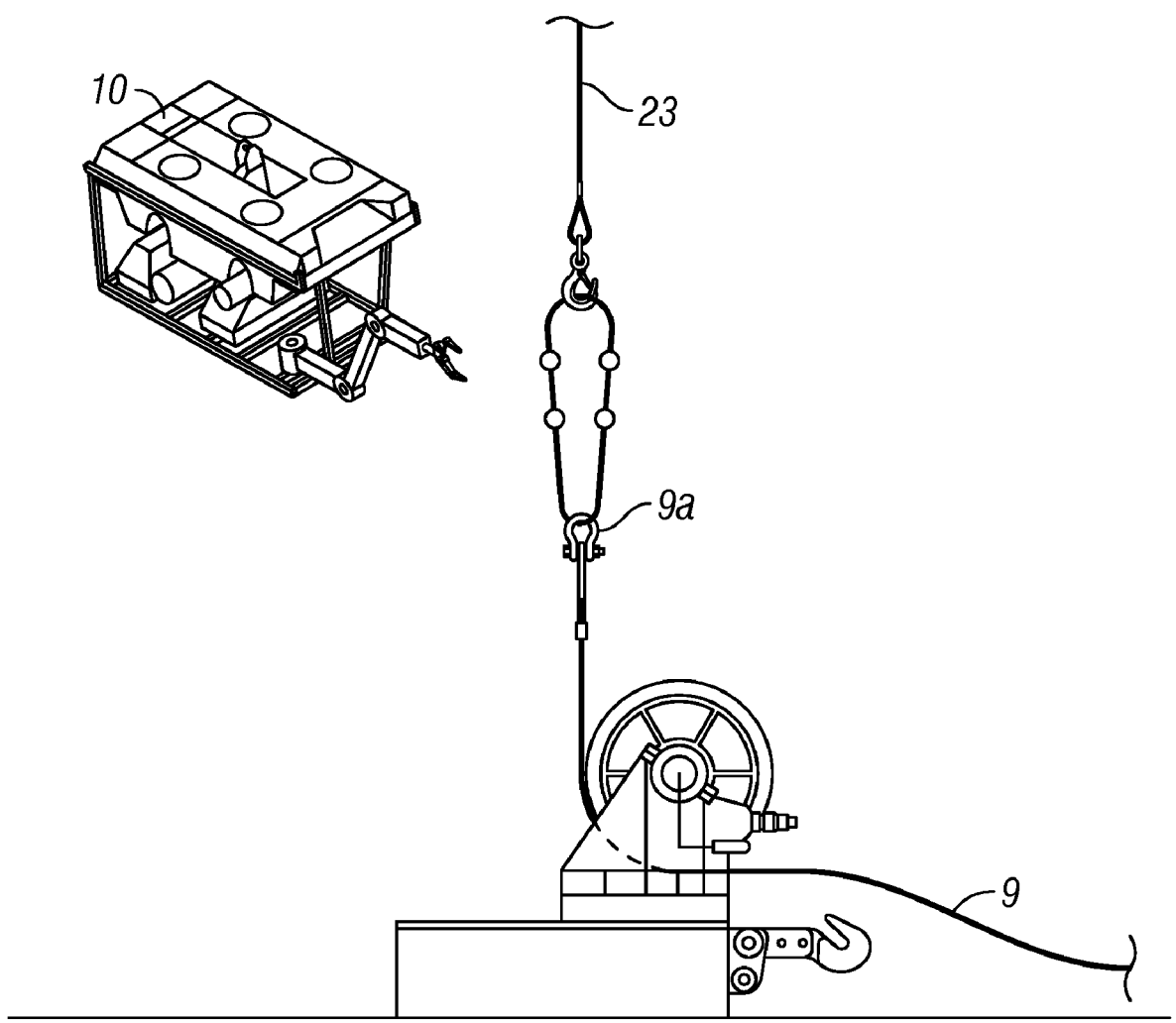
FIG. 15 is a schematic diagram of a detailed portion of the exemplary pipeline installation system, showing the intermediate wire in a slack position after being pulled through sheave with the crane wire.

FIG. 15 is a schematic diagram of a detailed portion of the exemplary pipeline installation system, showing the intermediate wire in a slack position after being pulled through sheave with the crane wire. The crane can lower the intermediate wire 23 to create slack in the messenger wire 9 and the coupling of the end 9a to the intermediate wire.

Figure 16:
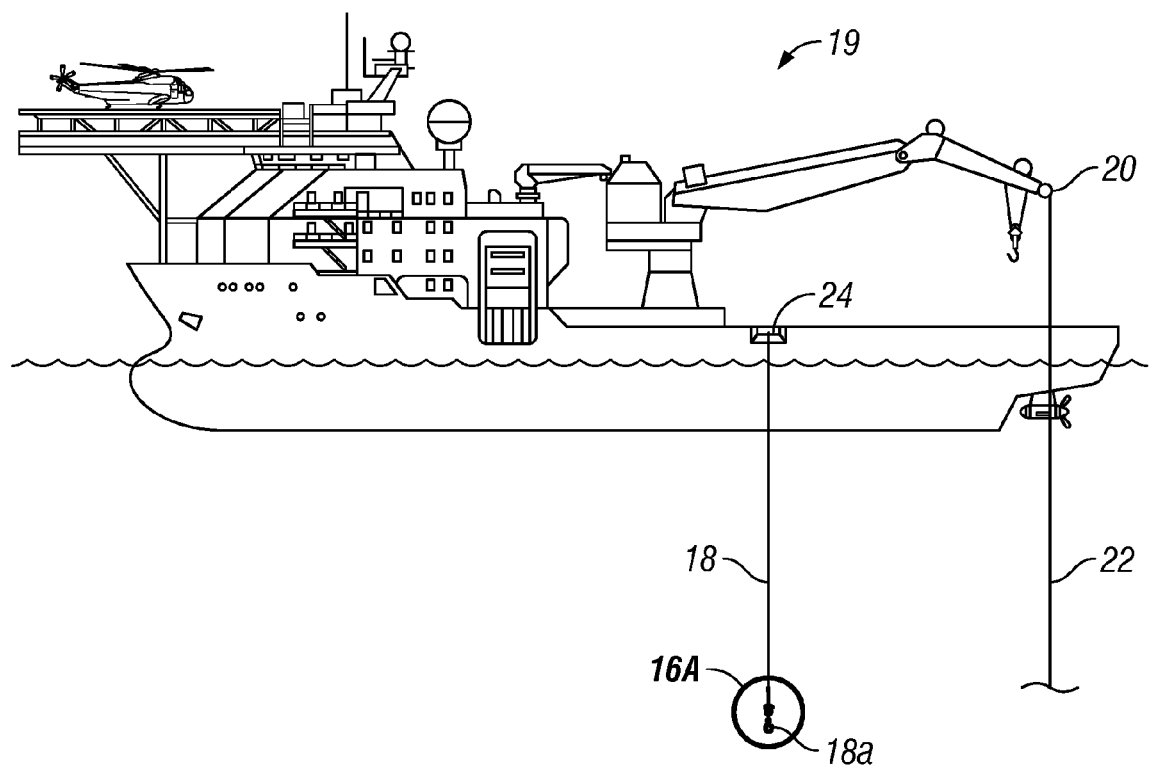
FIG. 16 is a schematic diagram of the exemplary pipeline installation system, showing a surface vessel with a crane, a winch, and a winch wire being lowered toward the sheave.
Figure 16A:
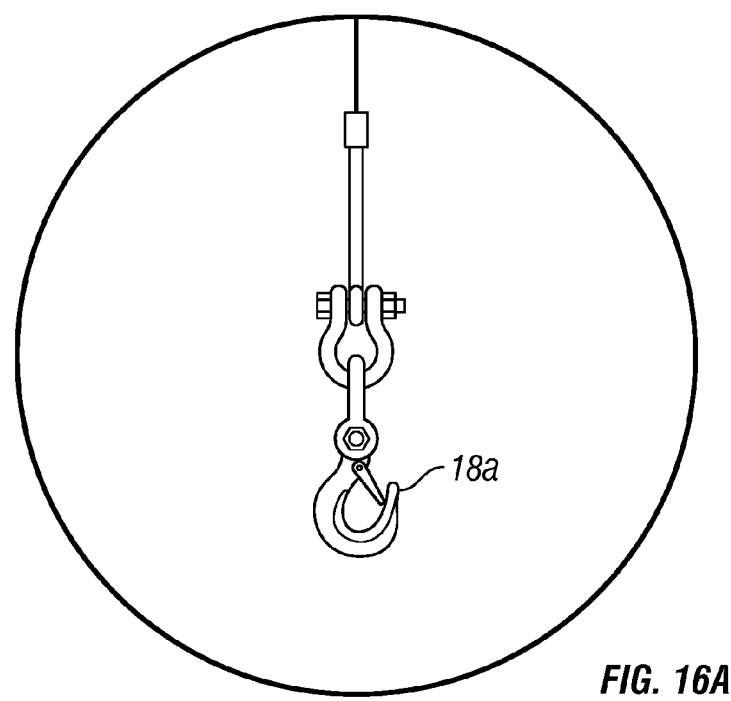
FIG. 16A is a detail schematic view of an end of the winch wire.

FIG. 16 is a schematic diagram of the exemplary pipeline installation system, showing a surface vessel with a crane, a winch, and a winch wire being lowered toward the sheave. FIG. 16A is a detail schematic view of an end of the winch wire and will be described in conjunction with FIG. 16. The crane 20 is useful for maneuvering and initial coupling of the crane wire 22 and intermediate wire with the messenger wire, described above. However, the crane and the winch on the crane may be unable to support the forces created by the pipeline on the system. Thus, a more generalized winch 24 can be used to proceed with pulling the pipeline into position. To accomplish this procedure, the winch 24 can lower a winch wire 18, described above. The winch wire 18 has an end 18a that can include a shackle, hook, swivel, and other coupling devices.

Figure 17:
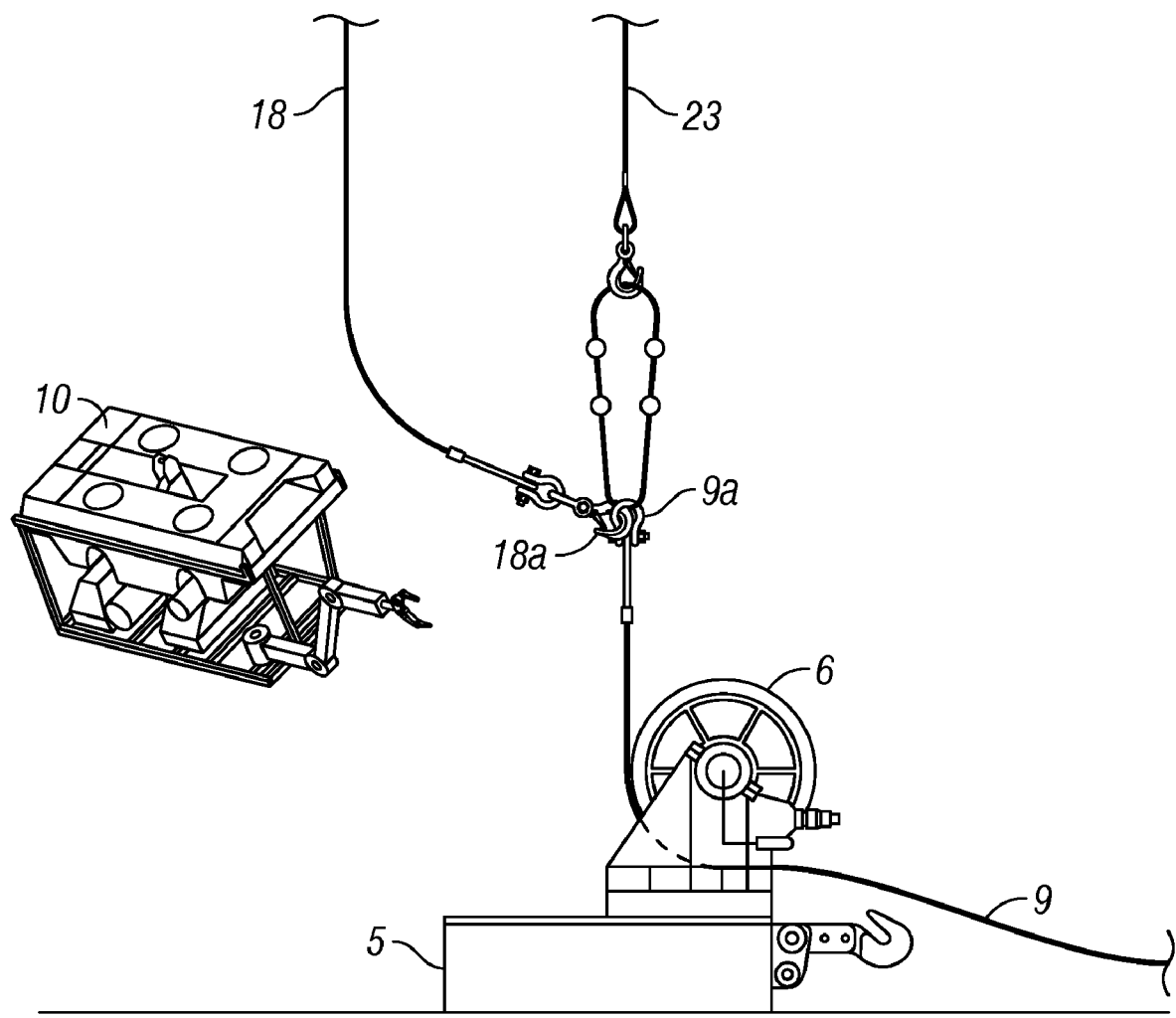
FIG. 17 is a schematic diagram of a detailed portion of the exemplary pipeline installation system, showing the winch wire being coupled to the messenger wire.

FIG. 17 is a schematic diagram of a detailed portion of the exemplary pipeline installation system, showing the winch wire being coupled to the messenger wire. The winch wire 18 can be lowered in proximity to the messenger wire 9. The ROV 10 can couple the end 18a of the winch wire 18 to the end 9a of the messenger wire 9. The ROV can uncouple the intermediate wire 23 from the messenger wire 9 and the intermediate wire be retrieved by reeling in the crane wire 22 to the crane shown in FIG. 16.

Figure 18:
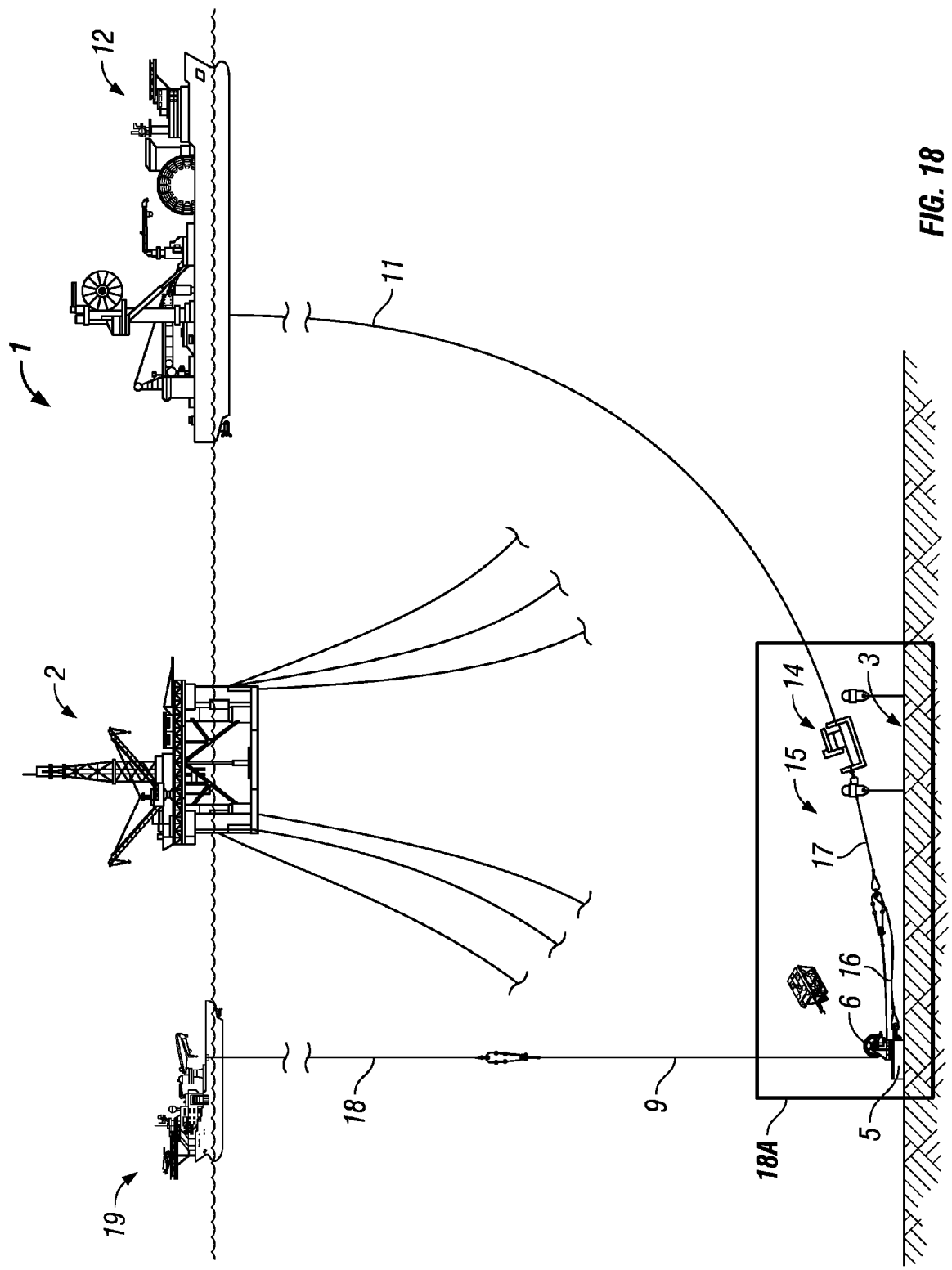
FIG. 18 is a schematic diagram of the exemplary pipeline installation system, showing an overall layout with the winch wire pulling the pipeline and the initiation wire coupled to the anchor.

FIG. 18 is a schematic diagram of the exemplary pipeline installation system, showing an overall layout with the winch wire pulling the pipeline and the initiation wire coupled to the anchor. The winch wire 18 is coupled to the messenger wire 9 and the messenger wire 9 is coupled to the end 14 of the pipeline 11 using the transfer sling 15. In the view shown, the winch on the surface vessel 19 has pulled the messenger wire at least partially through the sheave and the pipeline to the target area 3. In some procedures, the winch can pull at least a portion of the pull wire 17 of the transfer sling 15 through the sheave to allow the initiation cable 16 to be coupled to the anchor 5, in the procedures described above.

Figure 18A:
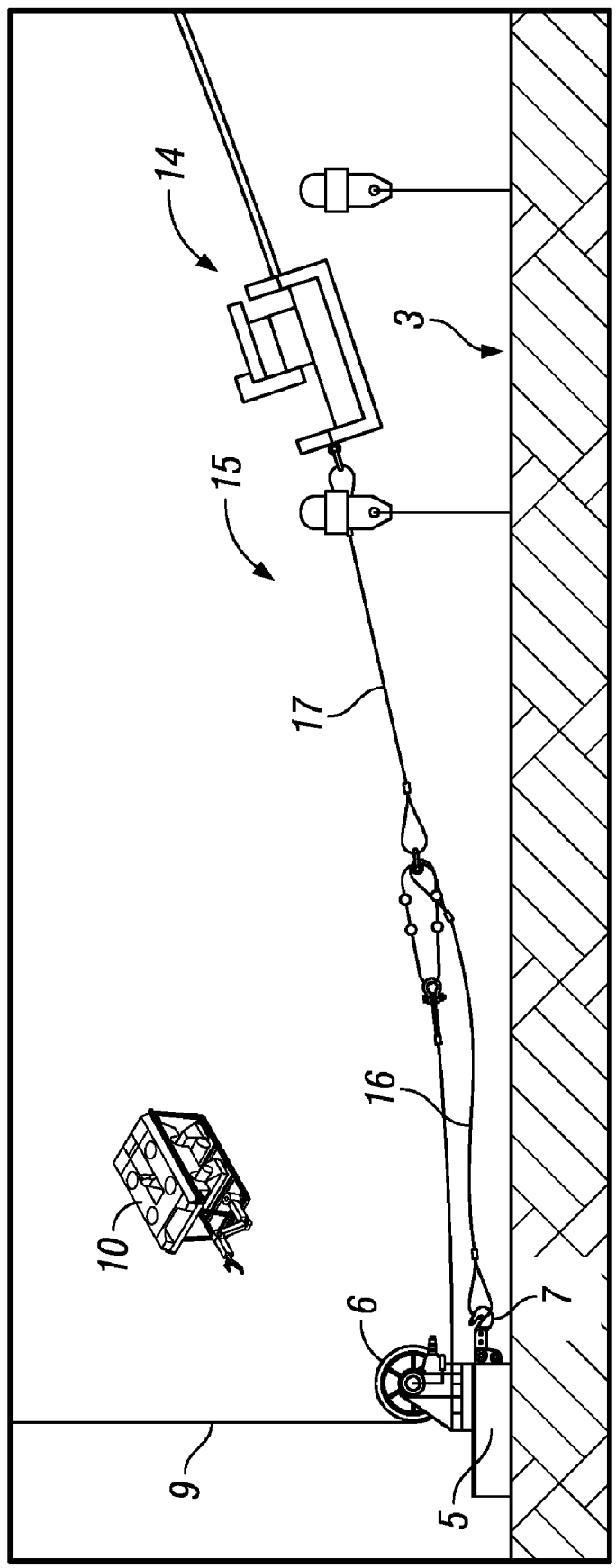
FIG. 18A is a schematic diagram of an alternative embodiment of the transfer sling.

FIG. 18A is a schematic diagram of an alternative embodiment of the transfer sling. The initiation wire 16 can be coupled in series with the pull wire 17. The procedure described above is the same or similar and the pipeline force is transferred from the sheave to the anchor. The messenger wire 9 is coupled to the pull wire 17 and the end 14 is pulled in proximity to the target area 3 using the sheave 6. When the initiation wire 16 is sufficiently close to the anchor 5, the initiation wire 16 is coupled to the anchor such as to the coupling 7, independent of the sheave 6. The messenger wire 9 can be unwound from the winch described above to create slack and can be uncoupled from the pull wire 17. The pipeline force is transferred to the initiation wire and anchor as described above. In such embodiment, the pull wire will generally be the same material and size as the initiation wire, because the pull wire will be supporting the pipeline force in series with the initiation wire.

Other and further embodiments utilizing one or more aspects of the inventions described above can be devised without departing from the spirit of Applicant's invention. This disclosure contemplates positioning a variety of components on the seabed, such as an end termination, sled, or other device that can not be coupled to the end of a pipeline. For example, a wire or strap can take the place of the pipeline discussed above (but is included within the definition of "pipeline" as broadly used herein) and can support a component to be placed on the seabed, such as oil and/or gas equipment desired below a surface facility. Further, the various methods and embodiments of the system and method for installing a subsea pipeline can be included in combination with each other to produce variations of the disclosed methods and embodiments. Discussion of singular elements can include plural elements and vice-versa.

The order of steps can occur in a variety of sequences unless otherwise specifically limited. The various steps described herein can be combined with other steps, interlineated with the stated steps, and/or split into multiple steps. Similarly, elements have been described functionally and can be embodied as separate components or can be combined into components having multiple functions.

The inventions have been described in the context of preferred and other embodiments and not every embodiment of the invention has been described. Obvious modifications and alterations to the described embodiments are available to those of ordinary skill in the art. The disclosed and undisclosed embodiments are not intended to limit or restrict the scope or applicability of the invention conceived of by the Applicants, but rather, in conformity with the patent laws, Applicants intend to fully protect all such modifications and improvements that come within the scope or range of equivalent of the following claims.

What is claimed is:

1. A pipeline installation system for positioning a pipeline in a target area on a seabed, comprising:
    an anchor installed in the seabed, the anchor having a sheave coupled thereto;
    at least a portion of a pipeline having a first end;
    a transfer sling coupled to the first end; and
    a winch wire releasably coupled to the transfer sling and adapted to cooperate with the sheave to pull the first end toward the target area.

2. The system of claim 1, wherein the transfer sling comprises a pull wire and an initiation wire and wherein the winch wire is coupled to the pull wire to pull the first end to the target area and the initiation wire is adapted to be coupled to the anchor and allow forces from the pipeline to be applied to the anchor independent of the sheave.

3. The system of claim 1, further comprising a messenger wire coupled between the winch wire and the transfer sling, wherein the messenger wire is adapted to pass between the anchor and the sheave.

4. The system of claim 3, further comprising a crane and a crane wire selectively coupled to the messenger wire prior to the messenger wire being coupled to the winch wire.

5. The system of claim 4, further comprising an intermediate wire coupled between the crane wire and the messenger wire.

6. The system of claim 1, further comprising a remotely operated vehicle adapted to manipulate one or more components of the system.

7. The system of claim 1, wherein access to the seabed target area is restricted by an overhead structure.

8. The system of claim 1, wherein at least a portion of the pipeline is provided by a pipelay vessel.

9. The system of claim 1, wherein the winch wire is provided by a vessel having a winch.

10. The system of claim 1, wherein the first end of the pipeline includes a pipeline end terminal.

11. The system of claim 1, wherein the anchor comprises a coupling adapted to couple the transfer sling to the anchor independent of the sheave.

12. A method for positioning a pipeline in a target area on a seabed using an anchor in the seabed, the anchor having a sheave coupled thereto, comprising:
   coupling a transfer sling to a pipeline having an end;
   positioning a messenger wire along a desired pipeline path;
   coupling a winch wire with the messenger wire;
   coupling the messenger wire with the transfer sling; and
   manipulating the winch wire so that the messenger wire travels through the sheave and the end of the pipeline travels along the desired pipeline path toward the anchor and passes at least partially into the target area.

13. The method of claim 12, wherein the transfer sling comprises a pull wire and an initiation cable and wherein coupling the messenger wire with the transfer sling comprises coupling the messenger wire with the pull wire.

14. The method of claim 13, further comprising manipulating the winch wire using the sheave until the initiation wire is proximate enough to the anchor to allow the initiation wire to be coupled to the anchor.

15. The method of claim 13, further comprising transferring a pipeline force created by the winch wire pulling the pipeline from the sheave to the anchor.

16. The method of claim 15, wherein transferring the pipeline force comprises pulling the pull wire of the transfer sling until the initiation wire can be coupled to the anchor independent of the sheave.

17. The method of claim 16, further comprising uncoupling the winch wire from the transfer sling.

18. The method of claim 12, wherein coupling the winch wire with the messenger wire comprises:
   lowering a crane wire to the sheave;
   coupling the crane wire with the messenger wire;
   pulling an end of the messenger wire through the sheave with the crane wire;
   coupling the winch wire with the messenger wire; and
   uncoupling the crane wire from the messenger wire.

19. The method of claim 18, wherein coupling the crane wire with the messenger wire comprises:
   coupling an intermediate wire with the crane wire;
   manipulating the intermediate wire through the sheave toward the messenger wire; and
   coupling the intermediate wire with the messenger wire.

20. A method for positioning a pipeline in a target area on a seabed using an anchor in the seabed, the anchor having a sheave coupled thereto, comprising:
   coupling a transfer sling to the pipeline having an end, the transfer sling having a pull wire and an initiation wire;
   coupling a winch wire to the pull wire of the transfer sling;
   manipulating the winch wire in cooperation with the sheave so that the end of the pipeline travels toward the anchor and passes at least partially into the target area;
   coupling the initiation wire to the anchor; and
   transferring a pipeline force created by the winch wire pulling the pipeline from the sheave to the anchor independent of the sheave.

21. The method of claim 20, wherein coupling the winch wire with the messenger wire comprises:
   lowering a crane wire to the sheave;
   coupling the crane wire with the messenger wire;
   pulling an end of the messenger wire through the sheave with the crane wire;
   coupling the winch wire with the messenger wire; and
   uncoupling the crane wire from the messenger wire.

* * * * *